3,285,953
ω-MONOALKYL ESTERS OF GLUTAMIC AND ASPARTIC ACID AND PROCESS FOR PRODUCING SAME
David Wasserman, Springfield, and John D. Garber and Frederick M. Meigs, Westfield, N.J., assignors to Merck & Co., Inc., Rahway, N.J., a corporation of New Jersey
No Drawing. Filed Jan. 6, 1964, Ser. No. 336,032
22 Claims. (Cl. 260—482)

This invention relates to novel compounds produced from glutamic acid and aspartic acid as starting materials and to methods for producing them. In one of its more specific aspects the invention is directed to novel ω-monoalkyl esters of said amino acids, the acid-addition and base salts thereof, and to methods for making them.

The novel esters of this invention are the ω-mono-alkyl esters of glutamic acid and aspartic acids of the following generic Formula I:

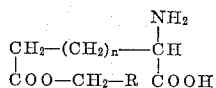

and the acid-addition salts thereof represented by the following generic Formula II:

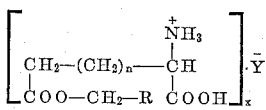

and the base salts thereof represented by the following generic Formula III:

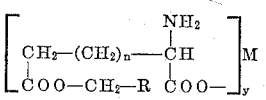

wherein each R is a straight or branched chain alkyl radical of at least 7 carbon atoms and preferably 7–21 carbon atoms; Y is an anion; M is a cation, such as a metal and preferably an ammonium radical, or an alkali metal such as sodium, potassium or lithium, or an alkaline earth metal such as calcium, magnesium, zinc, barium, etc., or other polyvalent metals, such as aluminum, titanium, etc.; $y$ is a positive number equal to the valency of M; $x$ is a positive integer equal to the valency of Y; and $n$ is zero or 1.

The novel compounds of this invention are unique and find application in a number of different fields. The novel ω-alkyl glutamates and aspartates are water-insoluble. The alkali metal salts and the acid-addition salts thereof are sufficiently water-soluble to find application as amphoteric surface active agents. A very unexpected and surprising utility of said novel glutamates and aspartates of this invention is that the N-carboxy anhydrides produced therefrom by reaction with phosgene have unusual and unexpected properties: The novel N-carboxy anhydrides may be polymerized to provide homopolymers and copolymers of unique properties and characteristics. The novel N-carboxy anhydrides as well as the polymerization products produced therewith have the unexpected and unique property of being soluble in aliphatic hydrocarbons at 50° C., as evidenced by their solubility in heptane, kerosene, aliphatic lubricating oils, mineral spirits, such as, "Varsol 1" (product of Humble Oil & Refining Company—an aliphatic distillate boiling at 161°–197° C., and having a kauri-butanol value of 39) at that temperature. Said novel N-carboxy anhydrides are soluble in 10% (w./v.) concentration in dry hexane at 50° C. In 0.1% (w./v.) concentration said polymers are soluble in "Varsol 1." The unique polymerization products can be employed to thicken various mineral and vegetable oils. They can be used to improve the viscosity index of mineral oils used for lubrication. Because of their good solubility in vegetable oils they may be used to convert liquid oils of vegetable origin into solid non-flowing products. They can be used to convert liquid hydrocarbons, such as, gasoline, kerosene, "Varsol 1," etc. into gels or solid fuels which may be used for heating purposes. They may be used also to produce "Napalm" type bombs. They may be used with the liquid rocket fuels to convert them into less dangerous solid fuels by dissolving through use of heat, a more active solvent or by using ultrasonic waves to disperse them in the hydrocarbon to be solidified. They may be combined with waxes to improve or impart toughness and flexibility thereto.

An object of the present invention is to provide novel derivatives of glutamic acid and aspartic acid.

Another object of this invention is to provide novel glutamates and aspartates, acid-addition salts and base salts thereof.

Another object of this invention is to provide novel glutamates and aspartates whose N-carboxy anhydrides are soluble in certain liquid hydrocarbons and in 10% concentration are soluble in dry hexane at 50° C.

Another object of this invention is to provide novel base salts of glutamates and aspartates which are ampho-teric surface active agents.

Another object of this invention is to provide novel methods and novel steps in the methods for producing the novel compounds of this invention.

Another object of this invention is to provide novel methods for producing novel esters of glutamic and aspartic acids in high yields and high purity.

Prior to this invention ω-methyl and ω-ethyl glutamates and aspartates have been produced. These particular esters are water-soluble; and the conventional methods for preparing the salts thereof and from which they may be derived by neutralization require the use of only three components. These components are methanol or ethanol, glutamic acid or aspartic acid and an appropriate acid in amount sufficient to form the acid-addition salt thereof soluble in the methanol or ethanol which is to be reacted therewith and in such excess as to act as a catalyst or condensing agent for esterification.

In the course of our experimentations we found that such prior art methods for producing the ω-methyl or ω-ethyl glutamates and aspartates were not of any practical value for the preparation of the novel glutamates and aspartates of this invention, when an alkyl monohydric primary alcohol of at least 8 carbon atoms was substituted for the methanol or ethanol used in such prior art methods.

Upon continuing our experiments we discovered that the novel glutamates and aspartates of the present invention could be easily and readily produced in good yields and are separable and recoverable without great purification difficulties or any significant decrease in the yield thereof thereby to produce novel free glutamates and aspartates of this invention of high purity.

We have discovered that for best results for the production of the novel glutamates and aspartates of this invention that one or more monohydric primary alkyl alcohols (R—CH$_2$—OH) of at least 8 carbon atoms be reacted with the glutamic or aspartic acid moiety of an acid addition salt thereof while in the presence of a strong acid catalyst and in a tertiary monohydric alcohol which acts as a cosolvent for said reactants. The strong acid employed as a catalyst is one which will not react with, will not cause dehydration of or otherwise decompose or adversely affect a significant or intolerable proportion of said tertiary alcohol cosolvent under the conditions of the esterification reaction.

A preferred class of such acids are those containing an SO₃H or an SO₄H moiety, and when employed, the acid salts used in such reaction are within the following generic Formula IV:

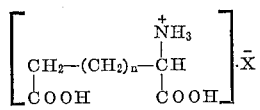

wherein X is an anion of a compound containing an SO₃H or an SO₄H moiety. The preferred tertiary alcohols are tertiary butanol, tertiary amyl alcohol, tertiary hexyl alcohol, and tertiary octyl alcohol, and of them, I prefer to use the tertiary butanol because of its lower cost. Examples of some of the acids which are employed either as the acidic catalyst and/or agent to be reacted with glutamic acid to provide compounds of Formula IV are: sulfuric acid, aromatic sulfonic acids, such as benzene sulfonic acid, naphthalene sulfonic acid, alkylaromatic sulfonic acids, such as paratoluene sulfonic acid, etc., and alkyl sulfonic acids and cycloalkyl sulfonic acids such as methyl, ethyl, propyl, butyl, etc., sulfonic acids, cyclobutyl, cyclohexyl sulfonic acids, etc., sulfated alcohols of 8–22 carbon atoms in which one mole of SO₃ or H₂SO₄ is reacted with one mole of the alcohol to form the acid sulfate thereof. The primary alcohol reactants employed are preferably of 8–22 carbon atoms and examples of some of them are octanol, decanol, dodecanol, tetradecanol, hexadecanol, octadecanol, eicosanol, 2-ethylhexanol, isooctanol, tridecanol, etc., as well as mixtures of two or more of them.

One of the preferred methods for producing said novel glutamates and aspartates is to mix together (a) glutamic acid or aspartic acid, (b) a primary alkanol of at least 8 carbon atoms, (c) a tertiary alcohol, and (d) an acidic agent having an SO₃H or an SO₄H moiety and combineable with (a) to form a compound of Formula IV. It is preferred that (d) be substantially water-free; however, it may be in aqueous solutions of lower concentrations, down to about 20%. The ratio of (d) to (a) is more than one mole of (d) per mole of (a) for the reason that in such a mixture one mole of (d) combines with one mole of (a) to provide (e) the salt thereof which is a compound of Formula IV. The excess of (d) present serves as an esterification catalyst or condensing agent and may range suitably from 0.1–2 moles and preferably approximately 0.5 mole of free (d) per mole of (e) therein. The mole ratio of (b) to (e) therein is at least 1 and generally 1–20 moles of (b) to 1 mole of (e) although the preferred ratio is 3–9 moles of (b) to 1 mole of (e). The ratio of (c) to (e) therein is 1–20 parts and preferably 3–15 parts by weight of (c) to 1 part by weight of (e). Instead of using glutamic acid or aspartic acid as an original material in providing said mixture any of the salts thereof of the general Formula IV may be substituted therefor and then the amount of acidic catalyst used to provide said mix is suitably 0.1–2 moles thereof per mole of said salt therein. This catalyst may be the same as or different from the acidic agent combined with glutamic or aspartic acid to provide said salt of general Formula IV and used as an original material in the production of said mixture. Then after said mixtures are produced, at least some of the components (b) and (e) are dissolved in the tertiary alcohol and reaction proceeds between (b) and (e) even at temperatures as low as 25° C. Such masses are permitted to remain at 25° C. for 24 hours whereby there are produced novel glutamate and aspartate salts within the scope of generic Formula II. These salts are neutralized to the novel free glutamates and aspartates which are subsequently separated therefrom. Due to the low temperature of 25° C. employed, this method is not as efficient as desired. We have discovered that the efficiency could be significantly increased by increasing said temperature to as high as about 100° C. However, temperatures in the range of 40° C.–80° C. are preferably employed and the optimum temperatures for carrying out the reaction are in the range of 60°–70° C. At the optimum temperatures said components (b), (c), (d), and (e) originally in said mixture form a clear solution due to the solubility of both (b) and (e) in (c) at said temperature. By operating at this temperature, the reaction between (b) and (e) proceeds rapidly yet smoothly, the reaction time is only about one and one quarter hours, and good yields of novel compounds of Formula II are obtained.

At the end of the reaction period, a suitable organic or inorganic base is added to the resultant mass to neutralize the free acidic agent therein, and also to neutralize the novel salt to provide the novel free ester. A tertiary amine is preferred for that purpose because of the possibility of reaction of secondary and primary amines with the novel ester therein to form amides which are undesirable. A tertiary amine which has been used is triethylamine. However, other tertiary amines and cyclic amines such as pyridine are just as useful. Then the novel free glutamates are separated therefrom and purified.

The following Examples I–VII are novel methods for producing some of the novel compounds of this invention. The methods as well as the compounds produced thereby are given by way of illustration and not limitation. In all of said Examples I–VII, sulfuric acid is employed as the acidic agent for reaction with glutamic or aspartic acid to provide a reactant of Formula IV and also as the condensing agent and t-butyl alcohol is employed as the cosolvent because of their low cost.

EXAMPLE I.—PREPARATION OF ω-n-DODECYL-L-GLUTAMATE

|  | Grams | Moles | Ml. |
| --- | --- | --- | --- |
| (1) L-glutamic acid | 220.5 | 1.5 |  |
| (2) t-Butyl alcohol |  |  | 1,500 |
| (3) n-Dodecyl alcohol | 1,116 | 6.0 |  |
| (4) Sulfuric acid (98%) |  | 2.25 | 120 |
| (5a) Triethylamine |  |  | 120 |
| (5b) Triethylamine |  |  | 450 |

A 12-liter 3-neck flask equipped with stirrer, thermometer and addition funnel was charged with (1), (2), and (3). This mixture was stirred and heated to 40° C. and then (4) was added dropwise thereto through the funnel whereupon the temperature thereof increased to 50° C. At this stage the mass contained only about .75 mole of free sulfuric acid because all of (1) had reacted with about 2 moles of the sulfuric acid to convert (1) into the acid addition salt thereof, within generic Formula IV, with the X thereof being SO₄H, and n being 1. The temperature of the mass was then raised to and maintained at 65° C. until said salt and (3) were dissolved in (2) and the mass became a clear solution. Then the solution was maintained at 65° C. for 1 hour to assure substantially complete reaction between said salt and (3) to produce in good yield a compound within the generic Formula II. The heat was turned off and (5a) was added dropwise thereto as rapidly as possible to neutralize the free sulfuric acid therein. This was followed by the addition thereto of 375 ml. of water and then 5250 ml. of 95% ethanol. While still being stirred, (5b) was added thereto to neutralize said salt and convert it into its free ester. At this stage the temperature of the mass had dropped to 45° C. Stirring was continued for an additional half hour and the crude free glutamate which had precipitated out was filtered out on a Buchner funnel. The recovered precipitate was slurried for 20 minutes at 65° C. with 4 liters of water and then filtered at 65° C. and a solid cake was recovered. The cake was washed with 1 liter of methanol, then with 1 liter of diethyl ether. Then it was dried at 50° C. in a vacuum oven for 3 hours and there was obtained crude ω-n-dodecyl-L-glutamate which weighed 253 grams (53.5% yield), melted at 170°–177° C. and contained no glutamic acid by paper strip assay using a ninhydrin color test.

*Purification*

The crude product was recrystallized by adding 8000 ml. of hot 2:1 isopropanol:water solution and heating to 83° C. until complete solution took place and then cooling the solution to 25° C. at which temperature the glutamate had precipitated out. The mass was filtered on a Buchner funnel to separate and recover the precipitate which was then displaced washed with 500 ml. of 2:1 isopropanol:water solution. The precipitate was further washed with 1500 ml. of methanol and then with 1500 ml. of diethyl ether and then air dried on the funnel. The so purified product was vacuum dried at 25° C.–30° C. in a vacuum oven overnight to constant weight and there was obtained 229 grams (48.5% yield) of pure ω-n-dodecyl-glutamate crystals, known as Product I, melting at 177°–177.4° C. Elemental analyses were:

Calculated: C, 64.72; H, 10.54. Found: C, 64.75; H, 10.39.

EXAMPLE II.—PREPARATION OF ω-n-TETRADECYL-L-GLUTAMATE

|  | Grams | Moles | Ml. |
|---|---|---|---|
| (1) L-glutamic acid | 220.5 | 1.5 |  |
| (2) t-Butyl alcohol |  |  | 1,500 |
| (3) n-Tetradecanol | 1,284 | 6.0 |  |
| (4) Sulfuric acid (98%) | 221.5 | 2.25 |  |
| (5a) Triethylamine |  |  | 105 |
| (5b) Triethylamine |  |  | 240 |

Using (1), (2), (3), (4), (5a), and (5b) of this example in place of those items of Example I, but otherwise repeating Example I, through the first filtration step thereof, crude ω-n-tetradecyl-L-glutamate precipitate was recovered. The precipitate was washed with 2 liters of methanol, then with 2 liters of diethyl ether and then dried to constant weight in a vacuum oven at 25° C. The dried crude ester weighed 383 grams (74.5% yield).

The crude ester was recrystallized from 9575 ml. of hot 1:1 butanol:water solution. Solution was effected at about 84° C. and then the solution was cooled at once to 30° C. whereupon the ester precipitated out. The mass was filtered through a coarse fritted glass Buchner funnel to separate and recover the precipitate. The precipitate was displace washed with 500 ml. of methanol, then with 500 ml. of diethyl ether and subsequently sucked dry and now was in the form of white crystalline plates. These plates were dried to constant weight in a vacuum oven at 25°–30° C. The resultant dry pure ω-n-tetradecyl-L-glutamate product, known as Product II, weighed 272.9 grams (53.2% yield), and melted at 175°–176.2° C. Paper strip assay thereof for glutamic acid was negative. Elemental analyses thereof were:

Calculated: C, 66.43; H, 10.86; N, 4.08; S, 0.0. Found: C, 66.44; H, 10.82; N, 4.07; S, 0.0.

EXAMPLE III.—PREPARATION OF ω-n-HEXADECYL-L-GLUTAMATE

|  | Grams | Moles | Ml. |
|---|---|---|---|
| (1) L-Glutamic acid | 14.7 | 0.1 |  |
| (2) t-Butanol |  |  | 200 |
| (3) n-Hexadecanol | 194.0 | 0.8 |  |
| (4) Sulfuric Acid (98%) |  | 0.15 | 8 |
| (5a) Triethylamine |  |  | 7 |
| (5b) Triethylamine |  |  | 18 |

Using (1), (2), (3), and (4) of this example in place of those items of Example I, but otherwise repeating Example I through the step where the heat was turned off, (5a) was then added dropwise to the reaction mass. This was followed by the addition thereto of 50 ml. of water and then 350 ml. of 95% ethanol. The salt therein was neutralized with (5b) and crude ω-n-hexadecyl-L-glutamate precipitated out and was recovered by filtration at 35° C. The precipitate was washed with 100 ml. of methanol and then with 100 ml. of diethyl ether and then sucked dry and finally dried in a vacuum oven at 25°–30° C. The dry crude precipitate weighed 28.65 grams (yield 77.6%).

*Purification*

One half (14.32 grams) of the dry crude precipitate was digested in a hot (80°–88° C.) mixture of 250 ml. of water and 100 ml. of isopropanol, then cooled to and filtered at 65° C. The recovered precipitate was washed with 50 ml. of cold water:isopropanol mixture, then with 50 ml. of methanol and finally with 50 ml. of diethyl ether. Then it was sucked dry and subsequently dried to constant weight in a vacuum oven at 25°–30° C. and there was obtained 11.2 grams (61% yield) of ω-n-hexadecyl-L-glutamate, melting at 172°–172.8° C., free of glutamic acid and known as Product III.

The other half (14.32 grams) of the crude precipitate was recrystallized from 350 ml. of 1:1 mixture of butanol and water by heating to 90° C., then cooled to 30° C. and filtered. The recovered precipitate was washed with 50 ml. of 1:1 water:isopropanol, then with 50 ml. of methanol and finally with 50 ml. of diethyl ether. The washed precipitate was dried and there was obtained 10.7 grams (58.5% yield) of pure ω-n-hexadecyl-L-glutamate product, known as Product IIIa, melting at 174.5°–175.2° C. The paper strip assay thereof for glutamic acid was negative. Elemental analyses were:

Calculated: C, 67.88; H, 11.12; N, 3.77; S, 0.0. Found: C, 67.55; H, 11.17; N, 4.00; S, <0.2.

EXAMPLE IV.—PREPARATION OF ω-n-OCTADECYL-L-GLUTAMATE

|  | Grams | Moles | Ml. |
|---|---|---|---|
| (1) Glutamic acid | 147 | 1.0 |  |
| (2) t-Butanol |  |  | 2,000 |
| (3) n-Octadecyl alcohol | 1,082 | 4.0 |  |
| (4) Sulfuric acid (98%) |  | 1.5 | 80.0 |
| (5a) Triethylamine |  | 0.5 | 70.0 |
| (5b) Triethylamine |  | 1.15 | 160.0 |

Using (1), (2), (3), (4), and (5a) of this example, in place of those items of Example I and otherwise repeating Example I up to and through the addition of (5a) therein, then 250 ml. of water and 3500 ml. of 95% ethanol were added thereto and then (5b) was added and the mass was stirred for 30 minutes. The resultant mass, containing crude free ester precipitate therein, was filtered at 35° C. to recover the precipitate. The precipitate was slurried in 3 liters of hot methanol at 65° C., filtered on a coarse fritted glass Buchner funnel, displace washed with 1000 ml. of diethyl ether and dried to constant weight in a vacuum oven at 25°–30° C. and there was obtained crude ω-n-octadecyl-L-glutamate product, weighing 238 grams (59.5% yield) and melting at 168°–178° C.

*Purification*

The crude glutamate was recrystallized with hot (80° C.) 1:1 n-butanol: water mixture by heating same therein, with stirring, to 92° C. and after complete solution cooling to 25° C. and filtering. Then it was washed with 500 ml. of methanol, then with 500 ml. of diethyl ether, and finally dried to constant weight in a vacuum oven at 25°–30° C. and there was obtained 183.5 grams (46% yield) of pure ω-n-octadecyl-L-glutamate product, known as Product IV. Paper strip assay thereof for glutamic acid was negative. Elemental analyses were:

Calculated: C, 69.13; H, 11.35;; N, 3.51; S, 0.0. Found: C, 69.16; H, 11.20; N, 3.58; S, 0.0.

EXAMPLE V.—PREPARATION OF ω-n-EICOSYL-L-GLUTAMATE

|  | Grams | Moles | Ml. |
|---|---|---|---|
| (1) L-glutamic acid | 38.6 | 0.26 | |
| (2) t-Butanol | | | 525 |
| (3) n-Eicosyl alcohol | 314.0 | 1.0 | |
| (4) Sulfuric acid (98%) | | 0.28 | 21.0 |
| (5a) Triethylamine | | 0.13 | 18.3 |
| (5b) Triethylamine | | 0.59 | 81.5 |

Using (1), (2), (3), (4), and (5a) of this example in place of those items of Example I, and otherwise repeating Example I up to and including the step of adding (5a) therein, then 65 ml. of water and 920 ml. of 95% ethanol were added to said mass. This was followed by the addition of (5b) to said mass after which the temperature thereof was raised to 65° C. and the mass was stirred for one half hour and filtered hot through a pre-heated coarse funnel to recover a filter cake of crude ω-n-eicosyl-L-glutamate. The cake was washed with 1050 ml. of hot methanol and then with 1050 ml. of diethyl ether. To remove unreacted glutamic acid therefrom, it was slurried in water at 85° C., filtered and washed again with methanol and diethyl ether and dried. 38 grams of the crude ester were obtained.

The crude ester was recrystallized with 950 ml. of 1:1 butanol:water by heating ot 94° C. to effect solution, cooling to 25° C., filtering, washing the filter cake with 250 ml. of methanol and then with 250 ml. of diethyl ether and finally drying in a vacuum oven. The dry purified ester was pure ω-n-eicosyl-L-glutamate, melting at 174°–175° C., known as Product V. Paper strip assay thereof for glutamic acid was negative. Elemental analyses were:

Calculated: C, 70.19; H, 11.55. Found: C, 70.19; H, 11.35.

EXAMPLE VI.—PREPARATION OF ω-n-OCTYL-L-GLUTAMATE

|  | Grams | Moles | Ml. |
|---|---|---|---|
| (1) L-glutamic acid | 220.5 | 1.5 | |
| (2) t-Butyl alcohol | | | 1,500 |
| (3) n-Octyl alcohol | 780 | 6.0 | |
| (4) Sulfuric acid (98%) | | 2.25 | 120 |
| (5a) Triethylamine | | | 120 |
| (5b) Triethylamine | | | 450 |

Using (1), (2), (3), (4), and (5a) of this example in place of those items of Example I, and otherwise repeating Example I through the step of the (5a) addition, then to the mass was added a mixture of 350 ml. of water and 5000 ml. of 95% methanol. Then the acid-addition salt of the ω-n-octyl-L-glutamate therein was neutralized by the addition of (5b) whereupon the crude free glutamate precipitated out. The mass was filtered to separate the precipitate which was then resuspended in 4 liters of water at 65° C. for 20 minutes and subsequently separated therefrom by filtration. The precipitate was washed with 1 liter of methanol and then with 1 liter of diethyl ether to remove occluded impurities, mainly di-octyl glutamate. The crude precipitate was ovendried and in that condition weighed 214 grams (55% yield). This crude ω-n-octyl-L-glutamate product had a melting point of 182.4°–184° C. and when subjected to a paper strip assay through a ninhydrin color development showed no glutamic acid.

Purification

The crude product was recrystallized by adding thereto 3 liters of 1:1 isopropanol-water solvent and heating the mass to 83° C. whereupon complete solution occurred. Immediately thereafter, the solution was cooled to 25° C. at which temperature the ester precipitated out as in crystalline form. The mass was filtered through a Buchner funnel to separate the ester which was then washed with 300 ml. of cold 1:1 ispropanol:water, then with 1 liter of methanol and finally with 1 liter of diethyl ether. Then the ester was dried to constant weight in a vacuum oven at 30°–35° C. whereby there was obtained 195 grams (50% yield) of pure ω-n-octyl-L-glutamate, known as Product VI, melting at 184.5°–185° C. and having elemental C, H, and N analyses that agreed with theoretically calculated values.

EXAMPLE VII.—PREPARATION OF ω-n-OCTADECYL-L-ASPARTATE

|  | Grams | Moles | Ml. |
|---|---|---|---|
| (1) L-aspartic acid | 133.1 | 1.0 | |
| (2) t-Butyl alcohol | | | 2,000 |
| (3) n-Octadecyl alcohol | 1,082 | | |
| (4) Sulfuric acid (98%) | | 1.5 | 80 |
| (5a) Triethylamine | 0.5 | | 70 |
| (5b) Triethylamine | 1.15 | | 160 |

Use (1), (2), (3), (4), and (5a) of this example in place of those items of Example I and otherwise repeating Example I, through the step of the (5a) addition, then to the mass add a mixture of 50 ml. of water and 3500 ml. of 95% methanol, and then (5b) whereupon the acid sulfate salt of ω-n-octadecyl-L-aspartate therein becomes converted to the free aspartate which precipitated out. Stir that suspension for 30 minutes and filter at 35° C. to separate the crude ω-n-octadecyl aspartate product. Resuspend the product in 3 liters of hot methanol at 65% C., filter, and wash with 1 liter of diethyl ether and finally oven dry to constant weight to yield 230 grams of crude ω-n-octadecyl-L-aspartate product weighing 230 grams.

Purification

Recrystallize the crude product from 1:1 butanol-water mixture with stirring and heating to over 90° C. for complete solution and then cool to 25° C. for crystallization. Remove crystalline product therefrom by filtration, then wash successively with 500 ml. of methanol and 500 ml. of diethyl ether and finally dry to constant weight at 25°–30° C. under vacuum whereby to obtain 180 grams (47% yield) of pure ω-n-octadecyl-L-aspartate, known as Product VII, and free of aspartic acid by paper strip chromatography.

The novel free glutamates and aspartates of this invention may be converted into acid-addition salts thereof of Formula II other than those of Examples I–VII herein. This may be readily achieved by heating to elevated temperature a mixture of a quantity of any of them and a quantity of the desired acid in an appropriate cosolvent therefor at the elevated temperature. A 1:1 propanol-water cosolvent and temperature of 80° C. are suitable for many of such mixtures. The acids which may be used are any of those heretofore recited or any of the hydrohalides, dichloracetic acid, trifluoracetic acid, phosphoric acid, di-alkyl phosphates, etc. It is obvious that by employing only 1 mole of sulfuric acid per 2 moles of the free glutamate or aspartate, the acid-addition salt produced is of Formula II, with $x$ being 2 and $Y$ being $SO_4$, and by employing 1 mole of a hydrohalide per mole of the free glutamate or aspartate, the acid-addition salt is of Formula II, with $x$ being 1 and $Y$ being a halogen atom.

Also the free glutamates and aspartates of this invention may be converted into the base salts of Formula III herein by reacting in an aqueous or alcoholic solution compounds of Formula I with the hydroxide of the desired cation. This is achieved by the careful addition of the hydroxide of the cation to such solution at room temperature to avoid hydrolysis of the ester.

While all of the specific esters produced in the foregoing examples are derived from the L-amino acids employed, it is to be understood that the D- and mixtures of L- and D-amino acids may be substituted for the L- amino acid; and it is also to be understood that unless otherwise specified in the description and claims, that the term "glutamic acid" shall mean either D-, L- or mixtures of D- and L-glutamic acid and that the term "aspartic acid" shall mean either L-, D- or mixtures of L- and D-aspartic acid; and it is also to be understood that unless otherwise specified, the term "R" as employed in the description and claims shall mean either straight or branched chain alkyl radical of 7–21 carbon atoms, and that n is 0 or 1.

The conversion of the novel compounds of this invention to N-carboxy anhydrides, polymerization of such anhydrides and the use of the resulting polymers is illustrated by the following examples.

A solution of 6 gm. of phosgene in 25 gm. of dioxane was added to a solution of 20 gm. of γ-n-octadecyl-L-glutamate in 150 gm. of dioxane, the addition being carried out at 50° C. over a 50 minute period. The mixture was held at 50° C. for two hours and then flushed with nitrogen for 15 minutes at 50° C. and 45 minutes while being cooled to 25° C. The solution was filtered, stripped of dioxane and dried at 30–35° C. in vacuo. The resulting N-carboxy anhydride of γ-n-octadecyl-L-glutamate was purified by recrystallizing four times from 100 gm. of hexane. The pure white crystalline product thus obtained melted at 77–78° C.

80 gm. of methylene chloride containing 1% of tributylamine was added to a solution of 90 gm. of the above anhydride in 1550 gm. of freshly distilled methylene chloride. At the end of 24 hours the anhydride had completely polymerized and the solution was poured into 4000 ml. of acetone. The solid polymer was recovered by filtration and dried. It was redissolved in 600 ml. of methylene chloride and precipitated by adding this solution with stirring to 2,400 ml. of acetone. 46.6 gm. of poly-γ-n-octadecyl-L-glutamate was obtained, molecular weight 118,000. This polymer was used to prepare a corn oil gel by dissolving it in methylene chloride to obtain a 1% (w./v.) solution. 10 ml. of this solution was mixed with 10 ml. of corn oil and the mixture sparged with nitrogen while warming on a steam bath until all of the methylene chloride was removed. The resulting thick syrup formed a gel on cooling.

Since certain changes may be made in the specific methods disclosed herein without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which as a matter of language might be said to fall therebetween.

We claim:

1. A compound selected from the group of compounds within the generic formula:

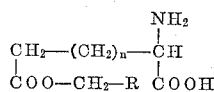

and the acid addition salts thereof and the base salts thereof; with R being an alkyl radical of at least 11 carbon atoms; and n is selected from the group consisting of 0 and 1.

2. A compound selected from the group of compounds within the generic formula:

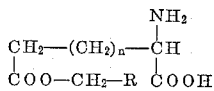

wherein R is an alkyl radical of 11–21 carbon atoms; and n is selected from the group consisting of 0 and 1.

3. A compound selected from the group consisting of ω-n-alkyl glutamates of the formula

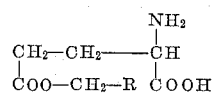

acid addition salts, and base salts thereof, wherein R is an alkyl radical of between 11 and 21 carbon atoms.

4. A compound selected from the group consisting of compounds within the generic formula:

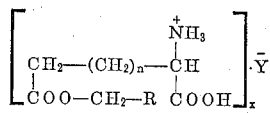

wherein R is an alkyl radical of 11–21 carbon atoms; Y is an anion; x is a positive integer equal to the valency of Y; and n is selected from the group consisting of 0 and 1.

5. A compound selected from the group consisting of compounds within the generic formula:

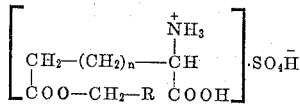

wherein R is a n-alkyl radical of 11–21 carbon atoms.

6. A compound selected from the group of compounds within the generic formula:

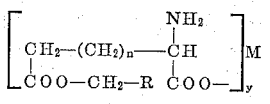

wherein R is an alkyl radical of 11–21 carbon atoms; M is a cation; and y is a positive integer equal to the valency 7. ω-n-Dodecyl-L-glutamate.
8. ω-n-Octadecyl-L-glutamate.
9. ω-n-Eicosyl-L-glutamate.

10. The method for producing an ω-alkyl ester of (A) a compound selected from the group of compounds within the generic formula:

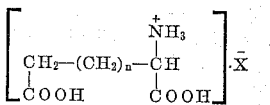

with X being an anion selected from the group consisting of anions of compounds containing an SO₄H moiety and anions of compounds containing an SO₃H moiety; and n being selected from the group consisting of 0 and 1; comprising in a tertiary monohydric alkanol, and in the presence of an acidic catalyst reacting (A) with an alkyl monohydric primary alcohol of at least 8 carbon atoms; said acidic catalyst being a compound selected from the group consisting of compounds containing an SO₄H moiety and compounds containing an SO₃H moiety.

11. The method defined in claim 10, said tertiary alcohol being tertiary butanol.

12. The method for producing a compound selected from the group of compounds within the generic formula:

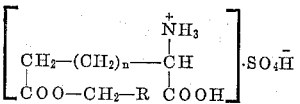

wherein R is an alkyl radical of at least 7 carbon atoms, and n is selected from the group consisting of 0 and 1; comprising in a tertiary monohydric alcohol and in the presence of sulfuric acid, reacting

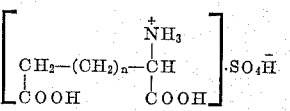

with a monohydric primary alcohol of at least 8 carbon atoms.

13. The method defined in claim 12, said tertiary alcohol being tertiary butanol.

14. The method for producing a ω-alkyl ester of (A)

a compound selected from the group of compounds of generic formula:

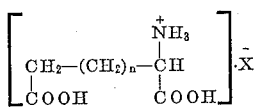

wherein X is an anion of a compound selected from the group of compounds having an $SO_4H$ moiety and compounds having an $SO_3H$ moiety, and $n$ is selected from the group consisting of 0 and 1, comprising heating together (A), (B) an alkyl monohydric primary alcohol of at least 8 carbon atoms, (C) a tertiary monohydric alcohol and (D) an acidic catalyst, said catalyst being a compound selected from the group of compounds having an $SO_4H$ moiety and compounds having an $SO_3H$ moiety, the mole ratio of (A) to (B) being 1 mole of (A) to 1–20 moles of (B), the ratio by weight of (C) to (A) being 1–20 parts of (C) to 1 part of (A).

15. The method defined in claim 14, said tertiary alcohol being tertiary butanol.

16. The method for producing an ω-n-alkyl ester of (A) a compound selected from the group of compounds of generic formula:

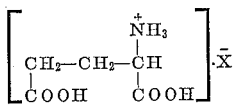

wherein X is an anion of a compound selected from the group of compounds having an $SO_4H$ moiety and compounds having an $SO_3H$ moiety; comprising maintaining in the temperature range of 25°–100° C. an intimate combination of (A), (B) an alkyl monohydric primary alcohol of at least 8 carbon atoms, (C) a tertiary monohydric alcohol and (D) an acidic catalyst being a compound selected from the group of compounds having an $SO_4H$ moiety and compounds having an $SO_3$ moiety.

17. The method defined in claim 16, said tertiary alcohol being tertiary butanol.

18. The method for producing an ω-alkyl ester of (A) a compound selected from the group of compounds within the generic formula:

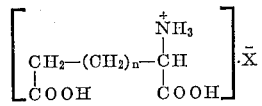

with X being an anion selected from the group consisting of anions of compounds containing an $SO_4H$ moiety and anions of compounds containing an $SO_3H$ moiety; and $n$ being selected from the group consisting of 0 and 1; comprising maintaining in the temperature range of about 60°–about 70° C. an intimate combination of (A), (B) an alkyl monohydric primary alcohol of at least 8 carbon atoms, (C) a tertiary monohydric alkanol, and (D) an acidic catalyst, said catalyst being a compound selected from the group consisting of compounds containing an $SO_4H$ moiety and compounds containing an $SO_3H$ moiety.

19. The method defined in claim 18, said tertiary alcohol being tertiary butanol.

20. The method for producing a compound selected from the group of compounds within the following formula:

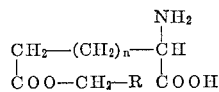

wherein R is an alkyl radical of at least 7 carbon atoms; and $n$ is 0 or 1; comprising the method defined in claim 10, then neutralizing the ω-alkyl ester of (A) produced.

21. The method defined in claim 20, said tertiary alcohol being tertiary butanol.

22. A step in the method for producing a ω-alkyl ester of an amino acid selected from the group consisting of glutamic and aspartic acids, with said alkyl group being of 8–22 carbon atoms comprising in a tertiary alcohol cosolvent reacting a primary alcohol of 8–22 carbon atoms with an acid addition salt of said amino acid in the presence of a strong acid incapable of decomposing said tertiary alcohol under the conditions of reaction.

References Cited by the Examiner

UNITED STATES PATENTS 2,561,323   7/1951   Waller _____ 260—482

LORRAINE A. WEINBERGER, *Primary Examiner.*

D. P. CLARKE, A. P. HALLUIN, *Assistant Examiners.*

UNITED STATES PATENT OFFICE
CERTIFICATE OF CORRECTION

Patent No. 3,285,953                    November 15, 1966

David Wasserman et al.

It is hereby certified that error appears in the above numbered patent requiring correction and that the said Letters Patent should read as corrected below.

Column 10, line 28, after "valency" insert -- of M. --.

Signed and sealed this 12th day of September 1967.

(SEAL)
Attest:

ERNEST W. SWIDER                    EDWARD J. BRENNER
Attesting Officer                    Commissioner of Patents